(No Model.) 2 Sheets—Sheet 1.
J. N. RUEBHAUSEN.
GAS STOVE.
No. 464,188. Patented Dec. 1, 1891.
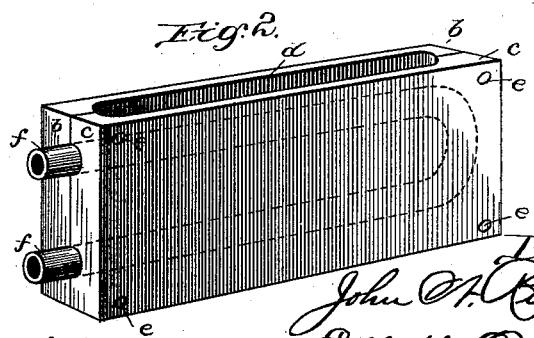

(No Model.) 2 Sheets—Sheet 2.
J. N. RUEBHAUSEN.
GAS STOVE.
No. 464,188. Patented Dec. 1, 1891.
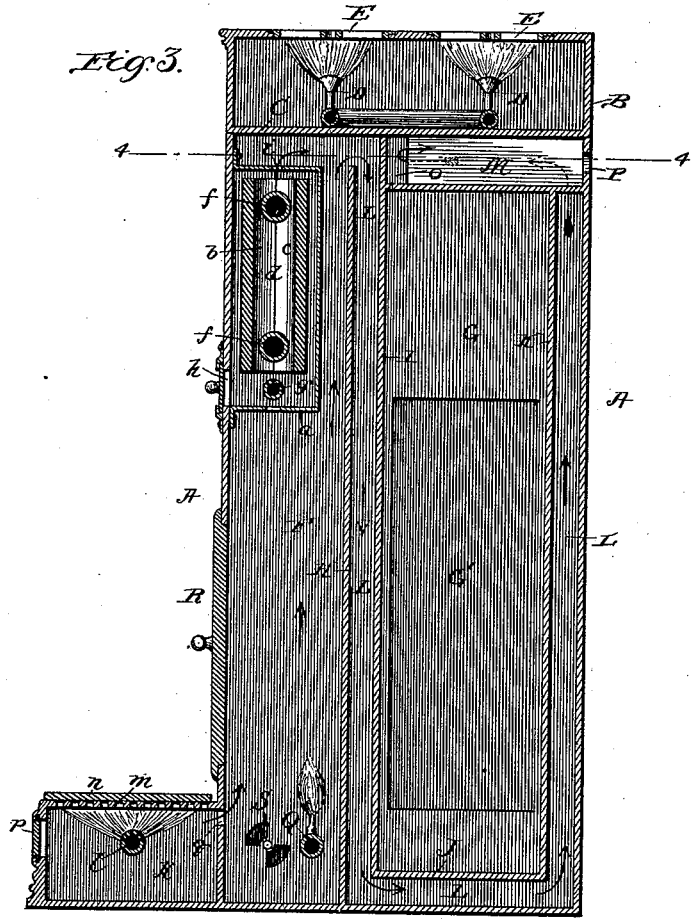
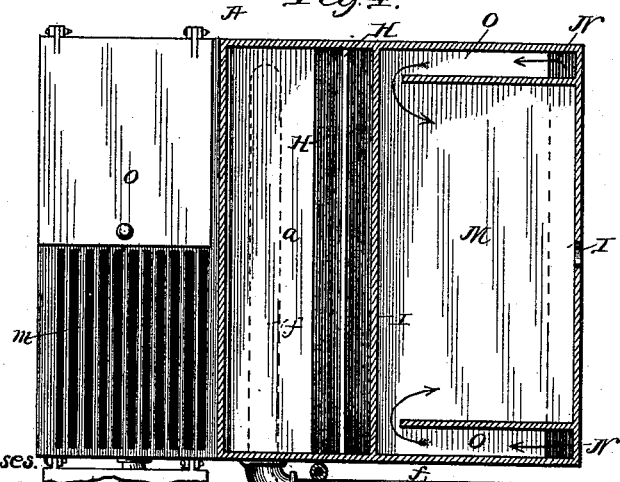
Witnesses.
Inventor:
J. N. Ruebhausen
By Elliott & Onohundro
Att'ys.

UNITED STATES PATENT OFFICE.

JOHN N. RUEBHAUSEN, OF CHICAGO, ILLINOIS.

GAS-STOVE.

SPECIFICATION forming part of Letters Patent No. 464,188, dated December 1, 1891.

Application filed December 18, 1890. Serial No. 375,079. (No model.)

*To all whom it may concern:*

Be it known that I, JOHN N. RUEBHAUSEN, a citizen of the United States, and a resident of the city of Chicago, county of Cook, and State of Illinois, have invented certain new and useful Improvements in Gas-Stoves, of which the following is a specification.

This invention relates to improvements in gas-stoves in which heretofore the oven has been heated by the passage therethrough of the products of combustion, the burner for producing the heat being invariably located at some point within the oven, which is objectionable, because food cooked in the oven will have a disagreeable taste imparted thereto by the products of combustion. This construction is further objectionable because only a very small percentage of the heat generated by the combustion of the gas in the oven is utilized for heating the same, as the products of combustion pass quickly and directly out of the oven, and the cooking of the article in the oven must depend almost wholly upon the direct radiation of heat from the flame.

The prime object of this invention is to have the oven a closed compartment heated by the passage of the products of combustion around, but not through, the same, whereby is avoided the tainting of food cooked in the oven by the products of combustion, and at the same time the heat generated by the combustion of the gas is utilized to the maximum degree.

Another object is to have a tortuous passage for the products of combustion around the oven of such peculiar and novel character that the products of combustion will be compelled to come in contact with every portion of the front, rear, top, and bottom of the oven before they can escape from the stove, thus insuring a perfect and uniform heating of the oven and utilization to the fullest extent of the products of combustion.

Another object is to combine with a gas-stove a water-front of novel construction for heating the water of a tank or water-back for bath-room and laundry purposes effectively and with great economy, thus overcoming another important objection to gas-stoves as heretofore constructed.

A further object is to have a broiler for the gas-stove as convenient in its location and effective in its operation as an ordinary broiler used with an open fire, and from which at the same time the products of combustion, as well as the fumes resulting from the cooking of meat, are carried off through the stove and not discharged into the room as heretofore.

A still further object is to have these several devices so combined and arranged in a gas-stove that the products of combustion, and consequently the heat from each of them, are compelled to pass around the oven before escaping from the stove, whereby the heat from the oven is rendered particularly effectual and the products of combustion of both the water-front and broiler, which have heretofore been wasted after heating the part to which they are especially applied, are now utilized to accomplish the very desirable end of raising to the maximum degree the temperature of the oven, thereby enabling the operation of the oven at the minimum expense.

These objects are attained by the devices illustrated in the accompanying drawings, in which—

Figure 1 represents a perspective view of a gas-stove embodying my invention; Fig. 2, a detail perspective view of the water-front; Fig. 3, a central vertical section through the stove; Fig. 4, a horizontal section on line 4 4 of Fig. 3.

Similar letters of reference indicate the same parts in the several figures of the drawings.

A gas-stove embodying my invention may have any suitable and desirable form and dimensions, so long as it is composed of the main body portion A and the supplemental portion B, separated by a suitable partition C, the upper and supplemental portion B, if desirable, being formed separately, with the partition C as a bottom therefor, and set upon the body portion A as a cap or cover.

The part B forms no part of the present invention and may have the construction of any gas-stove now in use, being simply any desirable number of burners D beneath the usual grated openings E, on which are heated pots, kettles, colanders, and similar utensils.

The main body of the stove A is divided into two principal compartments, one (the combustion-chamber F) occupying the front half or portion thereof and the oven G occupying the rear portion thereof, to which access is gained through doors G' in the end walls of the stove. These two compartments are separated by a double-wall partition, the front one H extending from the bottom of the stove nearly to the top of the compartment—that is, to the horizontally-roofing partition C—while the other I, which constitutes the inner wall of the oven, extends nearly to the bottom of the stove, where it joins the bottom J of the oven, which connects with another partition K, extending parallel with the partition I and the back wall of the stove, but at a sufficient distance from the latter to constitute an air-passage L, which begins at the top between the partitions H and I, extends between the bottom J of the oven and the bottom of the stove, and continues up between the partition K and the back of the stove into a discharging-compartment M located above the oven and with which the passage connects at each side or corner thereof through small openings N and auxiliary passages O, escaping from the chamber M through a stove-pipe opening P, from which they are conducted to a chimney or any other suitable point of discharge. The employment of the small passages or openings N and the auxiliary passage O serves to conduct the products of combustion to the extreme inner side of the oven-top before they are permitted to escape from the stove.

In the lower portion of the combustion-chamber F is located one or any desirable number of gas-burners Q, of any suitable construction, to which access is gained through a door R in the front side of the stove, and to which air for combustion is furnished through the slide S in the front-end wall of the stove, the heat and products of combustion from which burners pass up through the combustion-chamber and thence through the tortuous passage or flue L out of the stove in the manner before described, and it will thus be seen that not only none of the products of combustion enter the oven, but they are retarded in their escape from the stove and compelled to pass completely around the oven, along both sides and the top and bottom thereof, thus being retained in the stove long enough to impart the maximum degree of heat to the oven.

In the upper part of the combustion-chamber is a smaller chamber formed by an oblong casing $a$, in which is located the water-front, more clearly illustrated in Figs. 2 and 3, consisting of an oblong block formed in two longitudinal sections $b$ $c$, hollowed or chambered in their opposing faces to form a chamber $d$, and fastened together by means of screws or pins $e$, or in any other suitable manner. Between the sections is clamped and confined a coil-pipe $f$, the ends of which connect, respectively, with the upper and lower ends of the water-back or tank. The main body of the coil, extending longitudinally through the chamber $d$ and being of less diameter than said chamber, permits the passage therethrough of the heat and products of combustion from a gas-burner located just below the water-front, each section of which is composed of solid heavy cast-iron, and therefore capable of retaining a large portion of the heat.

Air is supplied to the burner $g$, in the chamber in which the water-front is located, through a slide $h$ of any suitable form, and escapes from said chamber with the products of combustion through a small orifice $i$ in the top of the casing $j$, from whence they pass into the tortuous passage L and out of the stove in the same manner as the products of combustion from the burner Q, which latter, however, is used only for the purpose of heating the oven, and may or may not be in use at the same time that the water-front is being heated.

At the bottom of the stove and forward of the combustion-chamber is still another chamber $k$, which I will designate the "broiler-chamber," rectangular in shape, having one or more burners $l$ located therein. The top of the chamber is formed of a griddle or spider $m$, or some similar devices suitable for broiling, which when not in use are covered by doors or, more properly speaking, hinged lids or covers $o$, hinged at the ends, respectively, of said chamber, so that they may be thrown back upon their hinges without disconnection from the stove whenever it is desired to use the broiler.

Air for combustion is supplied to the broiler-chamber through a slide $p$ in the front part thereof, and the products of combustion, as well as the fumes from the cooking of the meat, escape from the broiler-chamber into the combustion-chamber through an opening $q$ in the wall separating said chambers. There is a strong draft toward this opening, induced by the connection of the stove with the chimney or some other suitable point of discharge, whether the oven or water-front burners are in use or not; but this draft is, of course, materially enhanced or increased whenever one or both of these burners are working simultaneously with the broiler-burner, and hence whenever the broiler is in use the products of combustion and the fumes of the cooking meat, instead of passing out into the room, as has heretofore been the case, are drawn into the combustion-chamber and discharged from the stove to the chimney, thus obviating the most objectionable feature of a broiler as heretofore applied to gas-stoves.

I have found by practical demonstration that far less gas is required in the successful operation of a stove embodying my invention than for gas-stoves as heretofore constructed, for by reason of the peculiar combination and arrangement of elements all of the heat resulting from the combustion of the gas is utilized in the maximum degree, and is not discharged from the stove until all the beneficial effects thereof have been exhausted—a most important consideration in the use of gas-stoves, in which the prime consideration is economy, which cannot be effected when there is any wastage of the heat.

Having described my invention, what I claim, and desire to secure by Letters Patent, is—

1. In a gas-stove, the combination, with the water-front, consisting of side sections united together and chambered in their opposing faces and a pipe-coil clamped between said sections and extending into said chamber, of a suitable case therefor, provided with air inlet and discharge openings, and a burner or burners located beneath said water-front, substantially as described.

2. In a gas-stove, the combination, with the casing provided with air inlet and discharge openings and the burner $g$, of the water-front located in said casing, consisting of the sections $b$ $c$, chambered in their opposing faces, and the pipe-coil $f$, substantially as described.

3. In a gas-stove having a broiler-chamber provided with air inlet and discharge openings below the top thereof, the combination of a griddle-top for said chamber, a burner or burners located therein beneath the top, and hinged lids for covering said griddle-top, substantially as described.

JOHN N. RUEBHAUSEN.

Witnesses:
JAMES R. SCOTT,
R. C. OMOHUNDRO.